United States Patent
Lee et al.

(10) Patent No.: US 10,419,751 B2
(45) Date of Patent: Sep. 17, 2019

(54) METHOD AND APPARATUS FOR ENCODING VIDEO USING VARIABLE PARTITIONS FOR PREDICTIVE ENCODING, AND METHOD AND APPARATUS FOR DECODING VIDEO USING VARIABLE PARTITIONS FOR PREDICTIVE ENCODING

(71) Applicant: SAMSUNG ELECTRONICS CO., LTD., Suwon-si (KR)

(72) Inventors: Chang-Hyun Lee, Suwon-si (KR); Tammy Lee, Seoul (KR); Jianle Chen, Suwon-si (KR); Dae-sung Cho, Seoul (KR); Woo-jin Han, Suwon-si (KR); Il-koo Kim, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/232,156

(22) Filed: Dec. 26, 2018

(65) Prior Publication Data

US 2019/0132587 A1    May 2, 2019

Related U.S. Application Data

(63) Continuation of application No. 15/705,325, filed on Sep. 15, 2017, now Pat. No. 10,205,942, which is a
(Continued)

(30) Foreign Application Priority Data

Jan. 14, 2011    (KR) .................. 10-2011-0004019

(51) Int. Cl.
  *H04N 7/12*    (2006.01)
  *H04N 11/02*    (2006.01)
(Continued)

(52) U.S. Cl.
  CPC ......... *H04N 19/103* (2014.11); *H04N 19/119* (2014.11); *H04N 19/176* (2014.11);
(Continued)

(58) Field of Classification Search
  None
  See application file for complete search history.

(56) References Cited

U.S. PATENT DOCUMENTS 8,086,052 B2    12/2011    Toth et al.
8,879,626 B2    11/2014    Alshina et al.
(Continued)

FOREIGN PATENT DOCUMENTS

CN        1857001 A      11/2006
CN      101218830 A       7/2008
(Continued)

OTHER PUBLICATIONS

Communication dated Jul. 16, 2018 by the Korean Intellectual Property Office in counterpart Korean Patent Application No. 10-2018-0048021.
(Continued)

*Primary Examiner* — Talha M Nawaz
(74) *Attorney, Agent, or Firm* — Sughrue Mion, PLLC

(57) ABSTRACT

A video encoding method and apparatus and a video decoding method and apparatus are provided. The video encoding method includes: prediction encoding in units of a coding unit as a data unit for encoding a picture, by using partitions determined based on a first partition mode and a partition level, so as to select a partition for outputting an encoding result from among the determined partitions; and encoding and outputting partition information representing a first partition mode and a partition level of the selected partition. The first partition mode represents a shape and directionality of a partition as a data unit for performing the prediction
(Continued)

encoding on the coding unit, and the partition level represents a degree to which the coding unit is split into partitions for detailed motion prediction.

3 Claims, 17 Drawing Sheets

Related U.S. Application Data continuation of application No. 14/831,043, filed on Aug. 20, 2015, now Pat. No. 9,787,983, which is a continuation of application No. 13/522,408, filed as application No. PCT/KR2011/000300 on Jan. 14, 2011, now Pat. No. 9,137,533.

(60) Provisional application No. 61/295,312, filed on Jan. 15, 2010.

(51) Int. Cl.
| | |
|---|---|
| *H04N 11/04* | (2006.01) |
| *H04N 19/103* | (2014.01) |
| *H04N 19/57* | (2014.01) |
| *H04N 19/46* | (2014.01) |
| *H04N 19/61* | (2014.01) |
| *H04N 19/176* | (2014.01) |
| *H04N 19/119* | (2014.01) |

(52) U.S. Cl.
CPC ............. *H04N 19/46* (2014.11); *H04N 19/57* (2014.11); *H04N 19/61* (2014.11)

(56) References Cited

U.S. PATENT DOCUMENTS

| | | | |
|---|---|---|---|
| 9,118,913 | B2 | 8/2015 | Alshina et al. |
| 9,591,308 | B2 | 3/2017 | Moriya et al. |
| 2004/0081238 | A1 | 4/2004 | Parhy |
| 2004/0131272 | A1* | 7/2004 | Kobayashi ............ H04N 19/197 382/247 |
| 2005/0114093 | A1 | 5/2005 | Cha et al. |
| 2006/0008006 | A1 | 1/2006 | Cha et al. |
| 2006/0125956 | A1* | 6/2006 | Lee ..................... H04N 7/012 348/452 |
| 2008/0123947 | A1 | 5/2008 | Moriya et al. |
| 2008/0175317 | A1* | 7/2008 | Han ..................... H04N 19/50 375/240.12 |
| 2009/0034856 | A1 | 2/2009 | Moriya et al. |
| 2009/0274219 | A1* | 11/2009 | Greene ................ H04N 19/115 375/240.26 |
| 2010/0322315 | A1* | 12/2010 | Hasuo ................. H04N 19/139 375/240.16 |
| 2011/0096829 | A1 | 4/2011 | Han et al. |
| 2011/0170593 | A1 | 7/2011 | Kim et al. |
| 2011/0310973 | A1 | 12/2011 | Cheon et al. |
| 2012/0106629 | A1 | 5/2012 | Zheng et al. |
| 2012/0328015 | A1* | 12/2012 | Kim ..................... H04N 19/40 375/240.13 |
| 2013/0003855 | A1 | 1/2013 | Park et al. |
| 2013/0148726 | A1 | 6/2013 | Han et al. |
| 2013/0287106 | A1 | 10/2013 | Lee et al. |

FOREIGN PATENT DOCUMENTS

| | | |
|---|---|---|
| CN | 101273641 A | 9/2008 |
| CN | 101584219 A | 11/2009 |
| WO | 9717797 A2 | 5/1997 |
| WO | 2010/002214 A2 | 7/2010 |

OTHER PUBLICATIONS

Communication issued by the State Intellectual Property Office of P.R. China dated Feb. 7, 2018 in counterpart Chinese Patent Application No. 201610059479.5.

Communication issued by the State Intellectual Property Office of P.R. China dated Feb. 24, 2018 in counterpart Chinese Patent Application No. 201610656814.X.

Communication issued by the State Intellectual Property Office of P.R. China dated Apr. 8, 2018 in counterpart Chinese Patent Application No. 201610657596.1.

Atul Puri et al., "Video coding using the H.264/MPEG-4 AVC compression standard", Signal Processing: Image Communication, Dec. 31, 2004, pp. 793-849, vol. 19.

Communication dated Oct. 27, 2014, issued by the State Intellectual Property Office of P.R. China in counterpart Chinese Application No. 201180014086.8.

Communication dated Jul. 13, 2017, issued by the Korean Intellectual Property Office in counterpart Korean Patent Application No. 10-2011-0004019.

International Search Report dated Sep. 9, 2011 from the International Searching Authority in counterpart application No. PCT/KR2011/000300.

ITU-T Telecommunications Standardization Sector, Study Group 16 Question 6, "Refined Results on the Low-overhead Prediction Modes," 15th Meeting: Pattaya, Thailand, Dec. 4-6, 2001, pp. 1-12.

Written Opinion dated Sep. 9, 2011 from the International Searching Authority in counterpart application No. PCT/KR2011/000300.

* cited by examiner

METHOD AND APPARATUS FOR ENCODING VIDEO USING VARIABLE PARTITIONS FOR PREDICTIVE ENCODING, AND METHOD AND APPARATUS FOR DECODING VIDEO USING VARIABLE PARTITIONS FOR PREDICTIVE ENCODING

CROSS-REFERENCE TO RELATED PATENT APPLICATIONS

This application is a continuation application of U.S. patent application Ser. No. 15/705,325, filed on Sep. 15, 2017, which is a continuation application of U.S. patent application Ser. No. 14/831,043, filed on Aug. 20, 2015, (now U.S. Pat. No. 9,787,983, issued Oct. 10, 2017) which is a continuation application of U.S. patent application Ser. No. 13/522,408, filed on Jul. 16, 2012 (now U.S. Pat. No. 9,137,533, issued Sep. 15, 2015), which is a National Stage application under 35 U.S.C. § 371 of PCT/KR2011/000300 filed on Jan. 14, 2011, which claims the benefit of U.S. Provisional Patent Application No. 61/295,312, filed on Jan. 15, 2010 in the U.S. Patent and Trademark Office, and claims priority from Korean Patent Application No. 10-2011-0004019, filed on Jan. 14, 2011 in the Korean Intellectual Property Office, all the disclosures of which are incorporated herein in their entireties by reference.

BACKGROUND

1. Field

Apparatuses and methods consistent with exemplary embodiments relate to encoding and decoding a video.

2. Description of the Related Art

As hardware for reproducing and storing high resolution or high quality video content is being developed and supplied, a need for a video codec for effectively encoding or decoding the high resolution or high quality video content is increasing. In a related art video codec, a video is encoded according to a limited encoding method based on a macroblock having a predetermined size.

Video compression uses spatial correlations and temporal correlations. Generally, inter-prediction is performed in units of specific size data, for example, 16×16 macroblocks. When a macroblock having a specific size is split into two, four, or a greater number of motion areas and inter-prediction is then performed on each motion area, distortion of a restored image in relation to the original image may occur, and overhead for transmitting a result of the inter prediction may be generated. When a motion area for inter-prediction is finely split, distortion of a restored image in relation to the original image decreases, but overhead increases. Accordingly, in inter-prediction, there is a trade-off relationship between a distortion of a restored image in relation to the original image and an overhead for transmitting an inter prediction result.

SUMMARY

Aspects of one or more exemplary embodiments relate to video encoding and video decoding that use a partition having a variable shape and a variable size for prediction encoding.

According to an aspect of an exemplary embodiment, there is provided a video encoding method using a variable partition, the video encoding method including: performing prediction encoding in units of a coding unit as a data unit for encoding a picture, by using partitions determined based on a first partition mode and a partition level, so as to select a partition which is to output an encoding result from among the determined partitions, wherein the first partition mode represents a shape and directionality of a partition as a data unit for performing prediction encoding on the coding unit, and the partition level represents a degree to which the coding unit is split into partitions for detailed motion prediction; and encoding and outputting partition information representing a first partition mode and a partition level of the selected partition.

Not only a partition that is the same size as an existing macroblock, a partition that is half the size of the existing macroblock, and a partition that is quarter the size of the existing macroblock may be determined, but also a partition capable of predicting a change in the directionality and position of a texture and a detailed motion may be determined. Since the shape and direction of a partition that allow a detailed motion of a partition to be predicted may be adjusted based on the size of a coding unit, prediction encoding and decoding may be performed in sufficient consideration of image characteristics.

According to an aspect of an exemplary embodiment, there is provided a video encoding method using a variable partition, the method including: performing prediction encoding in units of a coding unit as a data unit for encoding a picture, by using partitions determined based on a first partition mode and a partition level, so as to select a partition which is to output an encoding result from among the determined partitions, wherein the first partition mode represents a shape and directionality of a partition as a data unit for performing prediction encoding on the coding unit, and the partition level represents a degree to which the coding unit is split into partitions for detailed motion prediction; and encoding and outputting partition information representing a first partition mode and a partition level of the selected partition.

According to an aspect of another exemplary embodiment, there is provided a video decoding method using a variable partition, the method including: extracting partition information including a first partition mode and a partition level from a received bitstream, wherein the extracting is performed on units of a coding unit as a data unit for encoding a picture, the first partition mode represents the shape and directionality of a partition as a data unit for performing prediction decoding on the coding unit, and the partition level represents a degree to which the coding unit is split into partitions for detailed motion prediction; and restoring the picture by performing prediction decoding by using partitions determined based on the first partition mode and the partition level of the extracted partition information.

According to an aspect of another exemplary embodiment, there is provided a video encoding apparatus using a variable partition, the apparatus including: an encoder which performs prediction encoding in units of a coding unit as a data unit for encoding a picture, by using partitions determined based on a first partition mode and a partition level so as to select a partition which is to output an encoding result from among the determined partitions, and encodes the picture so as to determine an encoding mode of the coding unit, wherein the first partition mode represents a shape and directionality of a partition as a data unit for performing prediction encoding on the coding unit, and the partition level represents a degree to which the coding unit is split into partitions for detailed motion prediction; and an output unit which encodes and outputs partition information representing a first partition mode and a partition level of the selected partition, information about a prediction mode of the selected partition, and encoding information including information about the encoding mode and encodes and outputs a motion vector and residual data of the selected partition.

According to an aspect of another exemplary embodiment, there is provided a video decoding apparatus using a variable partition, the apparatus including: an extractor which extracts partition information including a first partition mode, the first partition mode representing a shape and directionality of a partition as a data unit for performing prediction encoding on a coding unit as a data unit for encoding a picture, and a partition level representing a degree to which the coding unit is split into partitions for detailed motion prediction, information about a prediction mode of the partition, encoding information including information about the encoding mode, and a motion vector and residual data of the partition, from a received bitstream, wherein the extraction is performed for each coding unit; and a decoder which performs prediction decoding on partitions determined based on the first partition mode and the partition level of the extracted partition information, based on a prediction mode of the determined partitions, and restores the picture according to the encoding mode.

According to an aspect of another exemplary embodiment, there is provided a computer-readable recording medium having recorded thereon a program for executing the video encoding method.

According to an aspect of another exemplary embodiment, there is provided a computer-readable recording medium having recorded thereon a program for executing the video decoding method.

DETAILED DESCRIPTION OF EXEMPLARY EMBODIMENTS

Hereinafter, an 'image' may denote a still image for a video or a moving image, that is, the video itself. Hereinafter, a 'data unit' may denote a collection of pieces of data falling within a predetermined range from among pieces of data of a video.

Encoding and decoding of a video by using a variable partition for prediction encoding, according to an exemplary embodiment, will now be described with reference to FIGS. 1 through 7. Encoding and decoding of a video by using a variable partition for prediction encoding on the basis of coding units having a tree structure, according to an exemplary embodiment, will be described below with reference to FIGS. 8 through 22.

Figure 1:
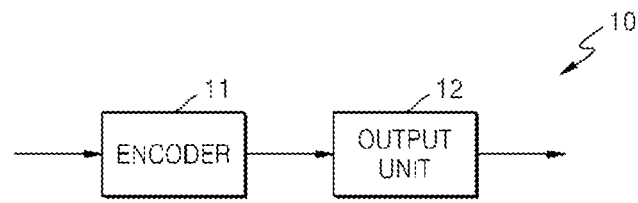
FIG. 1 is a block diagram of a video encoding apparatus using a variable partition, according to an exemplary embodiment.

FIG. 1 is a block diagram of a video encoding apparatus 10 using a variable partition for prediction encoding, according to an exemplary embodiment.

Referring to FIG. 1, the video encoding apparatus 10 using a variable partition includes an encoder 11 and an output unit 12. For convenience of explanation, the video encoding apparatus 10 using the variable partition will hereinafter be referred to as a video encoding apparatus 10.

The video encoding apparatus 10 receives a picture sequence of a video, encodes the picture sequence by performing inter-prediction, intra-prediction, transformation, quantization, and entropy encoding on each picture of the picture sequence, and outputs encoded video data, that is, a result of the encoding, and encoding information including information about an encoding mode.

The video encoding apparatus 10 may split a current picture into data units each having a predetermined size and perform encoding on each of the data units, in order to efficiently encode the current picture. Hereinafter, a data unit for encoding a picture is referred to as a 'coding unit'. The encoder 11 may determine a coding unit and an encoding method which is to be performed on each coding unit. The encoding method determined for each coding unit is referred to as an encoding mode.

Data redundancy may occur among temporally sequential images of a video or among spatially neighboring areas in an image of a video. During video compression encoding, a prediction encoding technique of performing encoding with reference to spatially/temporally neighboring data region(s) is performed to remove data redundancy among spatially/temporally adjacent data regions to reduce the size of encoded data.

In the prediction encoding technique, a neighboring data region having redundant data is searched for based on a data unit having a predetermined size and a predetermined shape, and thus a disparity (that is, a motion) between the searched redundant data units and a differential value (that is, a residual data) between the original and redundant data of the searched redundant data units may be encoded.

The encoder 11 may determine a partition that is a data unit whose motion is to be compared with a motion of neighboring data, in order to perform prediction encoding on each coding unit. The size of the partition may be smaller than or equal to that of the coding unit. The encoder 11 may output residual data obtained by removing redundant data from each partition, according to prediction encoding using the determined partition.

The encoder 11 selects a partition for outputting an encoding result, by performing prediction encoding using partitions that are determined based on first partition modes and partition levels.

The encoder 11 may perform prediction encoding on each coding unit by using partitions having various shapes, directionalities, and sizes, and select a partition through which residual data is to be finally output from among the partitions. A directionality of a partition represents a direction in which the partition is split from a coding unit. The encoder 11 may select a partition for prediction encoding resulting in a highest encoding efficiency by determining and comparing encoding efficiencies according to the various partitions.

Encoding efficiency may be determined in consideration of an error between original data and restored data, an overhead generated after encoding, and the like. The encoding efficiency according to prediction encoding may be measured using Rate-Distortion Optimization based on Lagrangian multipliers.

Partitions according to an exemplary embodiment may be defined based on the first partition modes and the partition levels. A first partition mode according to an exemplary embodiment indicates the shape and directionality of a partition.

For example, partition types such as a rectangular partition, a square partition, a non-rectangular partition, and the like may be defined depending on the type of first partition mode. For example, the directionality in which a coding unit is split, for example, i) partitions into which a coding unit is halved vertically, halved horizontally, halved both vertically and horizontally, or diagonally split, ii) partitions into which a coding unit is split along a split line biased on a left, right, upper or lower end of the coding unit, or iii) partitions obtained by splitting a coding unit from a width to a facing width, from a height to a facing height, from a width to an adjacent height, and from a height to an adjacent width, according to the first encoding mode may be defined.

A partition level according to an exemplary embodiment denotes a degree to which a coding unit is split into partitions for fine motion prediction. A split ratio of the width (height) of a partition to the width (height) of a coding unit may be determined depending on the value of partition level.

For example, as the partition level according to an exemplary embodiment increases, partitions obtained by finely splitting the width and height of a coding unit may be determined. For example, partitions obtained by splitting the width or height of a coding unit at $1:(n-1)$, $2:(n-2)$, ..., $(n-2):2$, and $(n-1):1$ may be determined based on division of the width or height of the coding unit into n equal parts. In this case, n may increase as the partition level increases.

However, a minimum size of a partition according to an exemplary embodiment is limited, that is, a coding unit cannot be split infinitely. Accordingly, the upper limit, the lower limit, or both the upper and lower limits of a partition level of a partition may be determined based on a size of a current coding unit, which is determined according to a hierarchical tree structure. The value of a partition level may be limited by a system or user setting.

The widths and heights of partitions whose shapes and directions are determined based on the first partition mode according to an exemplary embodiment may increase or decrease. The widths and heights of the partitions whose shapes and directions are determined based on the first partition mode according to an exemplary embodiment may be defined according to a second partition mode. In other words, the second partition mode may determine detailed partition types from among allowable partitions according to the first partition mode.

Shapes and directions of the partitions of the first partition mode are determined according to the first partition mode, and the width, the height, or both the width and the height of a partition increases or decreases to be one or more times the minimum width or minimum height of a partition that is determined according to the partition level. Thus, the second partition mode may be defined so as to indicate each of the partitions of the first partition mode.

For example, when the minimal width and the minimal height of a partition is determined to be $1/n$ of the width and height of a coding unit according to the partition level, the second partition mode indicates each of partitions into which the width or height of the coding unit is split at $1:(n-1)$, $2:(n-2)$, ..., $(n-2):2$, and $(n-1):1$.

Accordingly, the encoder 11 may also determine the second partition mode according to the first partition mode, and the types or number of second partition modes may be determined according to the first partition mode and the partition level.

The output unit 12 may encode and output partition information representing the first partition mode and the partition level of the partition selected by the encoder 11. The partition information may further include the second partition mode according to the first partition mode. The partition information may include partition level restriction information for determining the lower or upper limit of the partition level.

The output unit 12 may output a motion vector and residual data of a partition that have been generated by prediction-encoding using the partition determined by the encoder 11. The output unit 12 may also encode and output information about a prediction mode representing a prediction encoding method using the partition determined by the encoder 11, and encoding information including information about an encoding mode. Encoding information according to an exemplary embodiment may be inserted into a sequence parameter set (SPS). The encoding information according to an exemplary embodiment may be encoded in every unit of data units such as sequences, pictures, frames, slices, maximum coding units, or the like, and inserted into an output bitstream.

Figure 2:
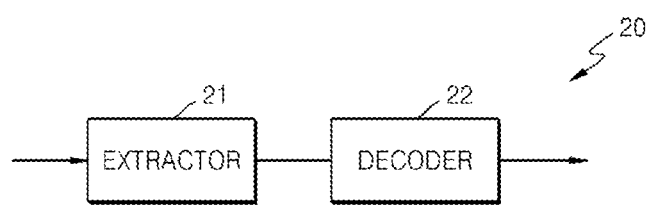
FIG. 2 is a block diagram of a video decoding apparatus using a variable partition, according to an exemplary embodiment.

FIG. 2 is a block diagram of a video decoding apparatus 20 using a variable partition for prediction encoding, according to an exemplary embodiment.

Referring to FIG. 2, the video decoding apparatus 20 using a variable partition for prediction encoding includes an extractor 21 and a decoder 22. For convenience of explanation, the video decoding apparatus 20 using a variable partition for prediction encoding will hereinafter be referred to as a video decoding apparatus 20.

The video decoding apparatus 20 may receive a bitstream into which a picture sequence of a video has been encoded, and perform decoding through entropy decoding, dequantization, inverse transformation, inter-prediction/compensation, and intra-prediction with respect to each encoded picture data, thereby restoring a picture.

The extractor 21 may parse the received bitstream to extract the encoded picture data and motion vectors. The extractor 21 may parse the received bitstream to extract encoded residual data.

The extractor 21 may parse the received bitstream to extract encoding information. The extractor 21 may read information about an encoding mode, partition information, and information about a prediction mode from the encoding information. The first partition mode and the partition level of a partition of a coding unit may be read from the partition information.

The partition information extracted by the extractor 21 may include information regarding shapes and directions of partitions that provide highest encoding efficiency, from among the partitions having a hierarchical tree structure that are formed by the first partition mode and the partition level.

The decoder 22 may determine a partition for prediction encoding with respect to the picture, based on the partition information extracted and read by the extractor 21. The decoder 22 may prediction-decode the encoded residual data of a partition by using the prediction mode and the motion vector extracted by the extractor 21.

The decoder 22 may determine a partition of each coding unit, based on the partition information. The decoder 22 may determine the shape of a partition and the directionality where a coding unit is split into partitions, based on the first partition mode included in the partition information. The decoder 22 may determine a degree to which a coding unit is finely spit into partitions, based on the partition level included in the partition information.

For example, the decoder 22 may determine partition types such as a rectangular partition, a square partition, a non-rectangular partition, and the like, depending on the type of first partition mode. The decoder 22 may determine the directionality where a coding unit is split into partitions, based on the first partition mode included in the partition information. For example, i) partitions according to the first partition modes may include partitions into which a coding unit is vertically, horizontally, both vertically and horizontally, and diagonally split, ii) a partition positioned on a left, right, upper or lower end of the coding unit, or iii) partitions obtained by splitting a coding unit from a width to a facing width, from a height to a facing height, from a width to an adjacent height, and from a height to an adjacent width.

The decoder 22 may determine a split ratio at which the width and height of a coding unit is split, based on the partition level. As the partition level increases, partitions obtained by finely splitting the width and height of a coding unit may be determined. For example, when partitions into which one of the width and the height or both of the width and height of a coding unit is split at 1:(n−1), 2:(n−2), . . . , (n−2):2, and (n−1):1 are determined, n may increase as the partition level increases.

The upper limit, the lower limit, or both the upper and lower limits of the partition level of a partition may be determined based on a size of a current coding unit, which is determined according to a hierarchical tree structure. Information about a limit value of a partition level in a system or user setting may be extracted from the received bitstream.

The extractor 21 may also extract a second partition mode representing a partition having a predetermined width and a predetermined height from among the partitions whose shapes and directions are determined based on the first partition mode, from the partition information. The decoder 22 my determine partitions of each coding unit, based on the first partition mode information, the partition level, and the second partition mode information that are included in the partition information.

The decoder 22 may increase or decrease the widths and heights of the partitions whose shapes and directions are determined based on the first partition mode, according to the second partition mode.

Since the first partition mode may determine shape and directionality of a partition, the partition level may determine the minimum width or minimum height of the partition, and the second partition mode may indicate each of partitions according to the first partition mode and the partition level, the width or height of a partition may be determined to be one or more times the minimum width or height of the partition.

For example, the minimum width and the minimum height of a partition may be determined to be 1/n of the width and height of a coding unit according to a partition level. The decoder 22 may determine partitions obtained by splitting the width or height of a coding unit at 1:(n−1), 2:(n−2), . . . , (n−2):2, and (n−1):1 based on a second partition mode.

The decoder 22 may perform prediction decoding on partitions determined based on partition information, according to a prediction mode, and restore a picture according to an encoding mode.

The video encoding apparatus 10 and the video decoding apparatus 20 may determine not only a partition that is the same size as an existing macroblock, a partition that is half the size of the existing macroblock, and a partition that is quarter the size of the existing macroblock, but also a partition capable of predicting a change in the directionality and position of a texture and a fine motion of a partition. Since the shape and direction of a partition that allow a detailed motion of a partition to be predicted may be adjusted based on the size of a coding unit, prediction encoding and decoding may be performed in sufficient consideration of image characteristics.

Figure 3:
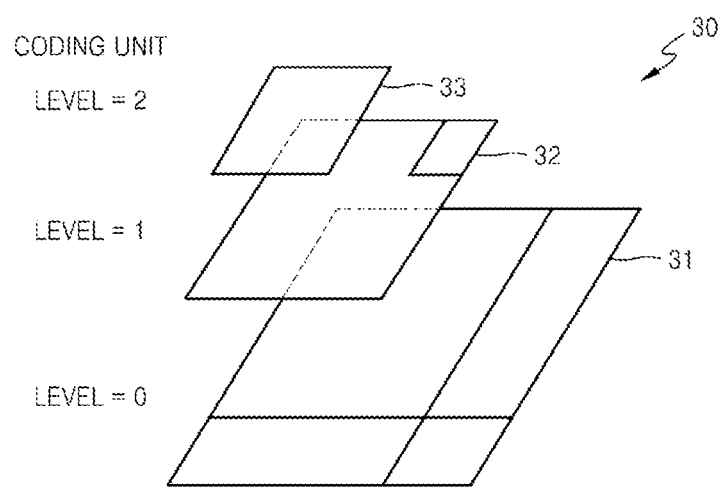
FIG. 3 is a diagram illustrating coding units having a hierarchical structure, according to an exemplary embodiment.

FIG. 3 is a diagram illustrating coding units 31, 32, and 33 having a hierarchical structure 30, according to an exemplary embodiment.

According to the hierarchical structure 30 of the coding units 31, 32, and 33, the coding units 31, 32, and 33 may be sequentially smaller as coding unit levels increase from 0 to 2 by increments of 1. As the sizes of the coding units 31, 32, and 33 are sequentially greater, more various shapes and directions of texture components may be included in the coding units 31, 32, and 33. A single coding unit may include different motion areas corresponding to different movements occurring over time, in a video sequence. Accordingly, for more detailed and precise prediction encoding on a coding unit, the shape, direction, and size of a partition included in the coding unit may vary according to the size of the coding unit.

Figure 4:
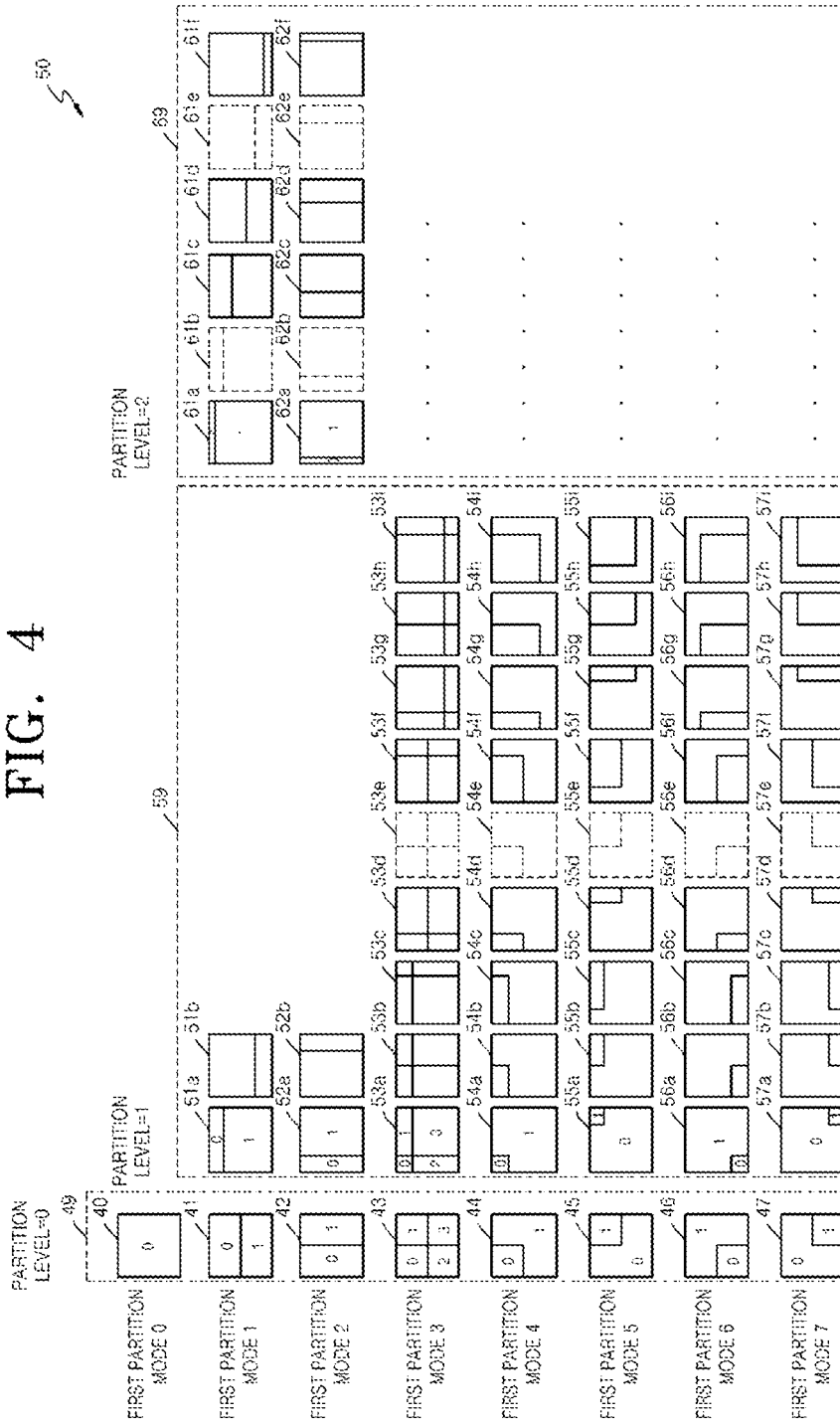
FIG. 4 illustrates partitions having a tree structure which are defined by a first partition mode and a partition level, according to an exemplary embodiment.

FIG. 4 illustrates partitions having a tree structure 50 which are defined by a first partition mode and a partition level, according to an exemplary embodiment.

The tree structure 50 may include partitions defined by the first partition mode and the partition level. The encoder 11 of the video encoding apparatus 10 may perform prediction encoding on each coding unit by using all of the partitions of the tree structure 50 and then determine a partition having a highest encoding efficiency, and the output unit 12 may encode and output residual data of the determined partition.

The first partition mode may represent the shape and directionality of a partition, and the partition level may denote a degree to which a coding unit is split into partitions for detailed motion prediction. Partitions may be defined by a combination of a first partition mode and a partition level.

A partition group 49 at a partition level of 0 includes a partition set 40 of a first partition mode 0, a partition set 41 of a first partition mode 1, a partition set 42 of a first partition mode 2, a partition set 43 of a first partition mode 3, a partition set 44 of a first partition mode 4, a partition set 45 of a first partition mode 5, a partition set 46 of a first partition mode 6, and a partition set 47 of a first partition mode 7.

The partition set 40 of the first partition mode 0 at the partition level of 0 includes a partition 0 having the same size as a coding unit.

The partition set 41 of the first partition mode 1 at the partition level of 0 may include rectangular partitions 0 and 1 into which a coding unit is halved horizontally. The partition set 42 of the first partition mode 2 at the partition level of 0 may include rectangular partitions 0 and 1 into which a coding unit is halved vertically.

The partition set 43 of the first partition mode 3 at the partition level of 0 may include rectangular partitions 0, 1, 2, and 3 into which a coding unit is halved both horizontally and vertically, namely, is quartered.

The partition set 44 of the first partition mode 4 at the partition level of 0 may include a rectangular partition 0 which is positioned on the left upper end of a coding unit and obtained by halving the left edge and the upper edge of the coding unit, and a non-rectangular partition 1 corresponding to a remaining part of the coding unit.

The partition set 45 of the first partition mode 5 at the partition level of 0 may include a rectangular partition 1 which is positioned on the right upper end of a coding unit and obtained by halving the right edge and the upper edge of the coding unit, and a non-rectangular partition 0 corresponding to a remaining part of the coding unit.

The partition set 46 of the first partition mode 6 at the partition level of 0 may include a rectangular partition 0 which is positioned on the left lower end of a coding unit and obtained by halving the left edge and the lower edge of the coding unit, and a non-rectangular partition 1 corresponding to a remaining part of the coding unit.

The partition set 47 of the first partition mode 7 at the partition level of 0 may include a rectangular partition 1 which is positioned on the right lower end of a coding unit and obtained by halving the right edge and the lower edge of the coding unit, and a non-rectangular partition 0 corresponding to a remaining part of the coding unit.

The first partition modes 1 and 2 may define partitions that allow accurate prediction encoding to be performed when different motions occur in upper and lower areas or left and right areas of a coding unit. The first partition mode 3 may define partitions that allow detailed prediction encoding to be performed when a plurality of objects or a plurality of areas exist within a coding unit and the coding unit has a complex motion.

The first partition modes 4, 5, 6, and 7 may define partitions that allow accurate prediction encoding to be performed with respect to areas defined by diagonal edges of a coding unit when the diagonal edges exist within the coding unit. However, when the first partition modes 3, 4, 5, 6, and 7 are used, accurate motion prediction is possible but an overhead increases. Thus, the first partition modes 3, 4, 5, 6, and 7 may be used in consideration of a trade-off between encoding efficiency and overhead.

Since the partition level represents a degree to which a coding unit is split into partitions to achieve detailed motion prediction, a minimum height or a minimum width of a partition may decrease as the partition level increases.

In the tree structure 50 of the partitions, the minimum width (minimum height) of a partition is obtained by dividing the width (height) of a coding unit by 2 to the power of a number, and the 2 to the power of a number increases as the partition level increases.

As described above, when a partition level is 0, the height (width) of a coding unit is not split or is halved. When the partition level is increased to be 1, the minimum height (minimum width) of a partition may be a quarter of the height (width) of a coding unit. When the partition level is increased to be 2, the minimum height (minimum width) of the partition may be one eighth of the height (width) of the coding unit.

The size of a coding unit does not vary regardless of the value of the partition level in the tree structure 50 of the partitions. A partition group 59 at a partition level of 1 has a precision twice as high as a precision at the partition level of 0. According to an exemplary embodiment, the first partition mode 1 at the partition level of 0 defines partitions into which the height of a coding unit is split with a precision of ½, and the first partition mode 1 at the partition level of 1 defines partitions into which the height of a coding unit is split with a precision of ¼. The first partition mode 1 at the partition level of 2 defines partitions into which the height of a coding unit is split with a precision of ⅛.

In a single first partition mode, partitions of the same shape may be repeated between partition levels. For example, in the first partition modes 3, 4, 5, 6, and 7, the partition sets 43, 44, 45, 46, and 47 at the partition level of 0 have the same shapes as partition sets 53e, 54e, 55e, 56e, and 57e at the partition level of 1, respectively. In the first partition modes 1 and 2, partition sets 51a and 51b at the partition level of 1 have the same shapes as partition sets 61b and 61e at the partition level of 2, respectively, and partition sets 52a and 52b at the partition level of 1 have the same shapes as partition sets 62b and 62e at the partition level of 2, respectively.

When partitions determined based on an identical first partition mode and different partition levels have the same shape, only partitions at a lower partition level from among the determined partitions may be used during prediction encoding. For example, in the first partition mode 3, since the partition set 53e at the partition level of 1 has the same shape as the partition set 43 at the partition level of 0, only the partition set 43 of the first partition mode 3 at the partition level of 0, which is lower than the partition level of 1, may be used during actual prediction encoding, and only partition information representing the partition set 43 may be encoded. In this case, partition information for representing the partition set 53e is not defined.

The partition sets 51*a* and 51*b* of the first partition mode 1 at the partition level of 1 may include rectangular partitions 0 and 1 into which a coding unit is horizontally split at 1:3 and 3:1, respectively. The partition sets 52*a* and 52*b* of the first partition mode 2 at the partition level of 1 may include rectangular partitions 0 and 1 into which a coding unit is vertically split at 1:3 and 3:1, respectively.

Each of the partition sets 53*a*, 53*b*, 53*c*, 53*d*, 53*e*, 53*f*, 53*g*, 53*h*, and 53*i* of the first partition mode 3 at the partition level of 1 may include 4 rectangular partitions 0, 1, 2, and 3 into which a coding unit is split horizontally and vertically so that at least one of the horizontal splitting and the vertical splitting is performed at 1:3, 2:2, or 3:1. However, in the first partition mode 3, the partition set 53*e* at the partition level of 1 duplicates the partition set 43 at the partition level of 0 and thus may not be used during prediction encoding. Partition information representing the partition set 53*e* of the first partition mode 3 at the partition level of 1 may not be defined.

Each of the partition sets 54*a*, 54*b*, 54*c*, 54*d*, 54*e*, 54*f*, 54*g*, 54*h*, and 54*i* of the first partition mode 4 at the partition level of 1 may include a rectangular partition 0 which is positioned on the left upper end of a coding unit and obtained by splitting at least one of the left and upper edges of the coding unit at 1:3, 2:2, or 3:1, and a non-rectangular partition 1 which is a remaining part of the coding unit. However, in the first partition mode 4, the partition set 54*e* at the partition level of 1 duplicates the partition set 44 at the partition level of 0 and thus may not be used during prediction encoding. In the partition level of 1, partition information representing the partition set 54*e* of the first partition mode 4 may not be defined.

Each of the partition sets 55*a*, 55*b*, 55*c*, 55*d*, 55*e*, 55*f*, 55*g*, 55*h*, and 55*i* of the first partition mode 5 at the partition level of 1 may include a rectangular partition 1 which is positioned on the right upper end of a coding unit and obtained by splitting at least one of the right and upper edges of the coding unit at 1:3, 2:2, or 3:1, and a non-rectangular partition 0 which is a remaining part of the coding unit. However, in the first partition mode 5, the partition set 55*e* at the partition level of 1 duplicates the partition set 45 at the partition level of 0 and thus may not be used during prediction encoding. In the partition level of 1, partition information representing the partition set 55*e* of the first partition mode 5 may not be defined.

Each of the partition sets 56*a*, 56*b*, 56*c*, 56*d*, 56*e*, 56*f*, 56*g*, 56*h*, and 56*i* of the first partition mode 6 at the partition level of 1 may include a rectangular partition 0 which is positioned on the left lower end of a coding unit and obtained by splitting at least one of the left and lower edges of the coding unit at 1:3, 2:2, or 3:1, and a non-rectangular partition 1 which is a remaining part of the coding unit. However, in the first partition mode 6, the partition set 56*e* at the partition level of 1 duplicates the partition set 46 at the partition level of 0 and thus may not be used during prediction encoding. In the partition level of 1, partition information representing the partition set 56*e* of the first partition mode 6 may not be defined.

Each of the partition sets 57*a*, 57*b*, 57*c*, 57*d*, 57*e*, 57*f*, 57*g*, 57*h*, and 57*i* of the first partition mode 7 at the partition level of 1 may include a rectangular partition 1 which is positioned on the right lower end of a coding unit and obtained by splitting at least one of the right and lower edges of the coding unit at 1:3, 2:2, or 3:1, and a non-rectangular partition 0 which is a remaining part of the coding unit. However, in the first partition mode 7, the partition set 57*e* at the partition level of 1 duplicates the partition set 47 at the partition level of 0 and thus may not be used during prediction encoding. In the partition level of 1, partition information representing the partition set 57*e* of the first partition mode 7 may not be defined.

Similarly, partition sets 61*a*, 61*b*, 61*c*, 61*d*, 61*e*, and 61*f* of the first partition mode 1 at the partition level of 2 may include rectangular partitions 0 and 1 into which a coding unit is horizontally split at 1:7, 2:6, 3:5, 5:3, 6:2, and 7:1, respectively. However, in the first partition mode 1, since the partition sets 61*b* and 61*e* at the partition level of 2 duplicate the partition sets 51*a* and 51*b* at the partition level of 1, respectively, information representing the partition sets 61*b* and 61*e* of the first partition mode 1 at the partition level of 2 may not be defined. The partition sets 62*a*, 62*b*, 62*c*, 62*d*, 62*e*, and 62*f* of the first partition mode 2 at the partition level of 2 may include rectangular partitions 0 and 1 into which a coding unit is vertically split at 1:7, 2:6, 3:5, 5:3, 6:2, and 7:1, respectively. However, in the first partition mode 1, since the partition sets 62*b* and 62*e* at the partition level of 2 duplicate the partition sets 52*a* and 52*b* at the partition level of 1, respectively, information representing the partition sets 62*b* and 62*e* of the first partition mode 1 at the partition level of 2 may not be defined.

Although partitions of the first partition modes 3, 4, 5, 6, and 7 at the partition level of 2 are not illustrated in FIG. 4 on account of space considerations, 4 rectangular partitions into which a coding unit is split horizontally and vertically so that at least one of the horizontal splitting and the vertical splitting is performed at 1:7, 2:6, 3:5, 4:4, 5:3, 6:2, or 7:1 may be defined in the first partition mode 3 at the partition level of 2.

In the first partition mode 4 at the partition level of 2, a rectangular partition which is positioned on the left upper end of a coding unit and obtained by splitting at least one of the left and upper edges of the coding unit at 1:7, 2:6, 3:5, 4:4, 5:3, 6:2, or 7:1, and a non-rectangular partition corresponding to a remaining part of the coding unit may be defined.

In the first partition mode 5 at the partition level of 2, a rectangular partition which is positioned on the right upper end of a coding unit and obtained by splitting at least one of the right and upper edges of the coding unit at 1:7, 2:6, 3:5, 4:4, 5:3, 6:2, or 7:1, and a non-rectangular partition corresponding to a remaining part of the coding unit may be defined.

In the first partition mode 6 at the partition level of 2, a rectangular partition which is positioned on the left lower end of a coding unit and obtained by splitting at least one of the left and lower edges of the coding unit at 1:7, 2:6, 3:5, 4:4, 5:3, 6:2, or 7:1, and a non-rectangular partition corresponding to a remaining part of the coding unit may be defined.

In the first partition mode 7 at the partition level of 2, a rectangular partition which is positioned on the right lower end of a coding unit and obtained by splitting at least one of the right and lower edges of the coding unit at 1:7, 2:6, 3:5, 4:4, 5:3, 6:2, or 7:1, and a non-rectangular partition corresponding to a remaining part of the coding unit may be defined.

When the size of a coding unit to be encoded is sufficiently large, a partition set may be expanded to partition levels 3 and 4.

Accordingly, in the tree structure 50 of the partitions, the shape and directionality of a partition may be determined based on a first partition mode, and the minimum width and the minimum height of the partition may be determined based on a partition level. Rectangular partitions determined based on the first partition mode and the partition level may include partitions each having a partition width double the minimum width and a partition height double the minimum height. In this case, a second partition mode may indicate a partition having a predetermined width or a predetermined height from among partitions determined based on the first partition mode and the partition level.

When a single coding unit includes two or more partitions and the width or height of a partition 0 is determined, the width or height of the remaining partition is determined based on the width or height of the partition 0. Thus, only the width or height of the partition 0 will now be discussed for convenience of explanation.

For example, in the tree structure 50 of partitions, the partitions 51*a* and 51*b* of the first partition mode 1 at the partition level of 1 are each determined to have a minimum height that is a quarter of the height of a coding unit. The heights of the partitions 51*a* and 51*b* of the first partition mode 1 at the partition level of 1 are the same as and three times the minimum height of each of the partitions 51*a* and 51*b*, respectively. In this case, the second partition mode may be defined so as to indicate each of the partitions 51*a* and 51*b* of the first partition mode 1 at the partition level of 1.

Similarly, in the first partition mode 4 at the partition level of 1, the minimum width and the minimum height of a rectangular partition may be determined to be ¼ the width and height of a coding unit, and a rectangular partition 0 positioned on the left upper end of the coding unit and a non-regular partition 1 corresponding to the remaining part of the coding unit may both be formed. The second partition mode of the first partition mode 4 at the partition level of 1 may be defined to indicate each of the partitions 54*a*, 54*b*, 54*c*, 54*d*, 54*f*, 54*g*, 54*h*, and 54*i*, which are determined with a variation of at least one of the width and height of a partition to one time, two times, or three times the minimum value of the partition. As described above, the partition 54*e* at the partition level of 1 may not be used in the first partition mode 4.

However, the second partition mode does not need to be separately defined at the partition level of 0. As a partition type that may exist according to a first partition mode or a partition level varies, the number of second partition modes, the range thereof, and the like may vary.

The video encoding apparatus 10 may perform prediction encoding based on various shapes, directions, and sizes of partitions by determining one partition from among the partitions of the tree structure 50. In a trade-off between the accuracy and calculation speed of prediction encoding in the video encoding apparatus 10, when the calculation speed is more important than the accuracy, the video encoding apparatus 10 may restrict a selection range of first partition modes, partition levels, or second partition modes of the partitions included in the tree structure 50.

The video encoding apparatus 10 may encode partition information such as the first partition mode, the partition level, and the second partition mode of each partition while encoding prediction mode information, a motion vector, and residual data of each partition. Accordingly, the video decoding apparatus 20 may determine a partition according to extracted partition information and perform prediction decoding by using the determined partition.

A minimal size of partition according to an exemplary embodiment may be a partition into which a minimum coding unit is quartered. Although the size of the partition according to an exemplary embodiment may be determined based on a partition level, the size is to be equal to or greater than the minimal size of the partition and smaller than or equal to a coding unit. Thus, the size of the partition depends on the size of the coding unit. Accordingly, the partition level may also depend on the size of the coding unit.

The area of a coding unit having a small size uses a partition for predicting a motion of a small area of the coding unit. However, as a coding unit becomes larger, not only a motion of a large area of the coding unit, but also a motion of a small area thereof may occur within the area of the coding unit. Thus, a coding unit having a large size is to undergo prediction encoding that uses not only large partitions, but also small partitions. Accordingly, a partition level may also be determined based on the size of a coding unit.

Thus, a relationship between the size of a coding unit according to an exemplary embodiment and a definable partition level is expressed in Table 1 below.

TABLE 1

| Size of coding unit | partition level = 0 | partition level = 1 | partition level = 2 | partition level = 3 | partition level = 4 |
|---|---|---|---|---|---|
| 128 × 128 | ○ | ○ | ○ | ○ | ○ |
| 64 × 64 | ○ | ○ | ○ | ○ | x |
| 32 × 32 | ○ | ○ | ○ | x | x |
| 16 × 16 | ○ | ○ | x | x | x |
| 8 × 8 | ○ | x | x | x | x |

Accordingly, only partitions having a partition level of 0, which is the lowest level, may be determined for an 8×8 coding unit. Partitions having partition levels of 0 and 1 may be determined for a 16×16 coding unit. Partitions having partition levels of 0 through 2, partitions having partition levels of 0 through 3, and partitions having partition levels of 0 through4 may be determined for 32×32, 64×64, and 128×128 coding units, respectively. Therefore, a partition level may be variably allowed based on the size of a coding unit.

Figure 5:
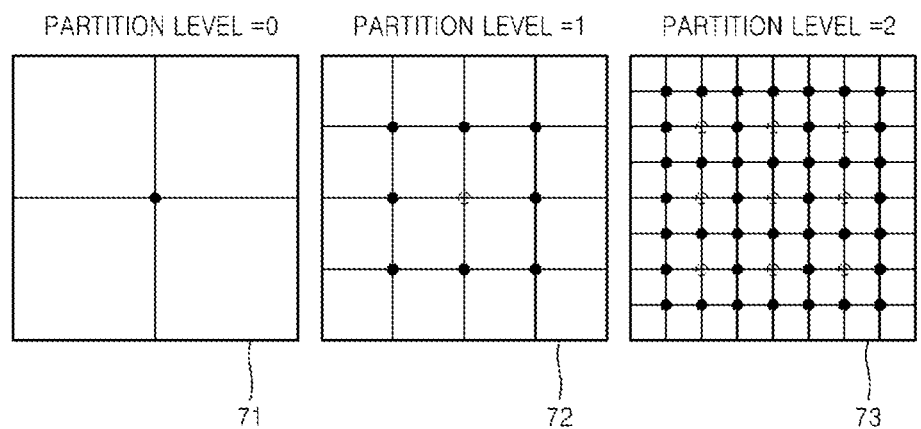
FIG. 5 illustrates a relationship among the first partition mode, the partition level, and a second partition mode, according to an exemplary embodiment.

FIG. 5 illustrates a relationship among the first partition mode, the partition level, and the second partition mode, according to an exemplary embodiment. In other words, the shapes of the first and second partition modes definable according to partition levels may be determined using points existing within coding units 71, 72, and 73 shown in FIG. 5.

In FIG. 5, lines within the coding units 71, 72, and 73 may serve as height or width edges of the partitions included in the coding units 71, 72, and 73, and dots therewithin may denote intersecting points where the width and height edges of a partition meet. For example, when straight lines are drawn from a predetermined intersecting point within the coding units 71, 72, and 73 to width or height edges of the coding units 71, 72, and 73 along the lines within the coding units 71, 72, and 73, partitions into which the coding units 71, 72, and 73 are split may be formed.

For example, at the partition level of 0, the lines within the coding unit 71 are lines that halve the width or height edge of the coding unit 71. A single intersecting point may be formed by the lines within the coding unit 71 intersecting with each other, and partitions surrounded by straight lines extending from the intersecting point to two of the left, right, upper, and lower edges of the coding unit 71 may be determined. In other words, the intersecting point of the lines within the coding unit 71 may be the vertex of each of the determined partitions. Accordingly, in each first partition mode at the partition level of 0, only one set of partitions may be defined within the coding unit 71. Since only one set of partitions is defined for each first partition mode, no second partition modes may be set.

At the partition level of 1, the lines within the coding unit 72 are lines that quarter the width or height edges of the coding unit 72. Although 9 partition vertexes may be generated by the lines within the coding unit 72 intersecting with each other, partitions may be generated based on 8 vertexes exclusive of a center intersecting point (white intersecting point) overlapping with the intersecting point at the partition level of 0. Accordingly, in each first partition mode at the partition level of 1, 8 partition sets may be defined within the coding unit 72.

Similarly, at the partition level of 2, the lines within the coding unit 73 are lines that split the width or height edges of the coding unit 73 into eight parts. Although 49 partition vertexes may be generated by the lines within the coding unit 73 intersecting with each other, partitions may be generated based on 40 vertexes exclusive of 9 intersecting points (white intersecting points) overlapping with the intersecting points at the partition levels of 0 and 1. Accordingly, in each first partition mode at the partition level of 2, 40 partition sets may be defined in the coding unit 73.

Accordingly, depending on the value of a partition level, the number of second partition modes included in a single first partition mode may correspond to the number of vertexes.

Figure 6:
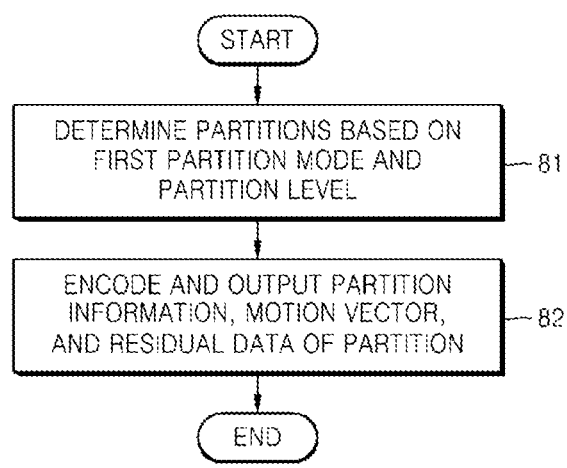
FIG. 6 is a flowchart of a video encoding method using a variable partition, according to an exemplary embodiment.

FIG. 6 is a flowchart of a video encoding method using a variable partition for prediction encoding, according to an exemplary embodiment.

In operation 81, prediction encoding is performed on each coding unit, which is a data unit for encoding a picture, by using partitions defined based on a first partition mode and a partition level, thereby determining a partition through which an encoding result is output.

The shape and splitting directionality of a partition may be determined based on the first partition mode, and the minimum width or the minimum height of the partition may be determined based on the partition level. A partition having highest encoding efficiency may be determined from the defined partitions by comparing results of prediction encoding on the defined partitions with one another, and residual data of the determined partition may be encoded.

An allowed range of partition levels may be determined based on the size of a coding unit. A second partition mode for indicating a partition having a predetermined width and a predetermined height may be further determined according to the first partition mode. An allowed range of the number of second partition modes may be determined based on the first partition mode and the partition level.

In operation 82, partition information representing the first partition mode and the partition level of the partition determined in operation 81 is encoded and output. The partition information may further include the second partition mode, depending on the first partition mode. A motion vector and residual data of each partition may be encoded and output. Encoding information including partition information and information about a prediction mode and an encoding mode may be encoded and output.

Figure 7:
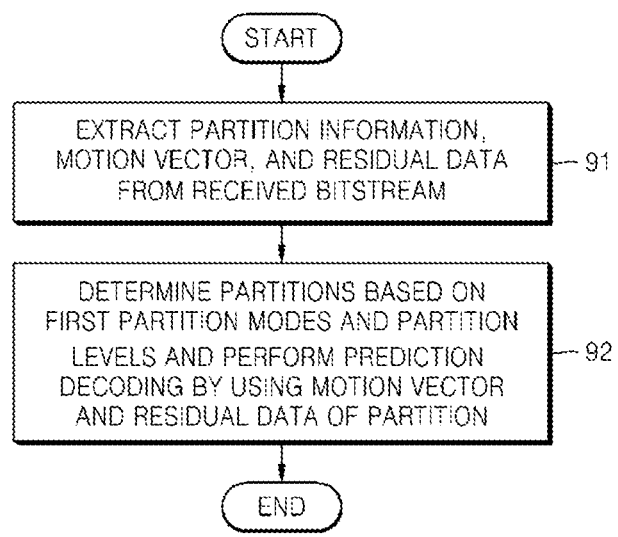
FIG. 7 is a flowchart of a video decoding method using a variable partition, according to an exemplary embodiment.

FIG. 7 is a flowchart of a video decoding method using a variable partition for prediction encoding, according to an exemplary embodiment.

In operation 91, partition information representing a first partition mode and a partition level of a partition of each coding unit is extracted from a received bitstream. A motion vector and residual data of each partition may be extracted by parsing the received bitstream. Encoding information including partition information and information about a prediction mode and an encoding mode may be extracted by parsing the received bitstream.

In operation 92, prediction decoding is performed using partitions determined based on the first partition modes and the partition levels of the partition information extracted in operation 91, thereby restoring a picture. The first partition modes and the partition levels may be read from the partition information, and second partition modes may be read according to the first partition modes. The shape and splitting directionality of a partition may be determined based on a first partition mode, and the width or height of the partition in relation to the width or height of a coding unit may be determined based on the partition level. The residual data of each partition may be decoded to restore a picture.

Encoding and decoding of a video by using a variable partition for prediction encoding on the basis of coding units having a tree structure, according to an exemplary embodiment, will now be described with reference to FIGS. 8 through 22.

Figure 8:
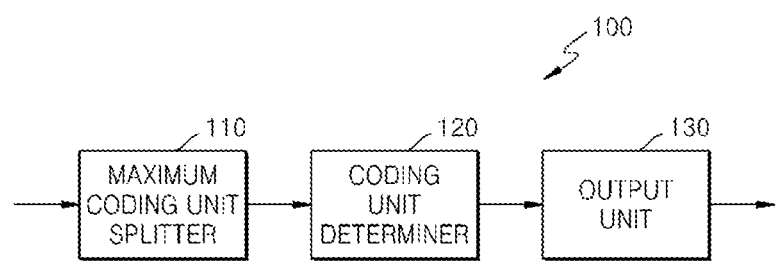
FIG. 8 is a block diagram of a video encoding apparatus that uses a variable partition for prediction encoding on the basis of coding units having a tree structure, according to an exemplary embodiment.

FIG. 8 is a block diagram of a video encoding apparatus that uses a variable partition for prediction encoding on the basis of coding units having a tree structure, according to an exemplary embodiment.

A video encoding apparatus 100 using a combination of data units on the basis of coding units having a tree structure, according to an exemplary embodiment, includes a maximum coding unit splitter 110, a coding unit determiner 120, and an output unit 130. For convenience of explanation, the video encoding apparatus 100 using the combination of data units on the basis of the coding units having a tree structure will hereinafter be shortened to a video encoding apparatus 100.

The maximum coding unit splitter 110 may split a current picture based on at least one maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit may be a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment may include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Examples of transformation performed for video encoding according to an exemplary embodiment may include frequency transformation, orthogonal transformation, integer transformation, and the like.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

The prediction unit according to an exemplary embodiment may include the partitions described above with reference to FIGS. 1 through 7. In other words, the shape and splitting directionality of a prediction unit may be determined based on a first partition mode according to an exemplary embodiment, and a ratio of the size of the prediction unit to the size of a coding unit may be determined based on the value of partition level. An allowed range of the partition level, that is, the upper or lower limit of the partition level, may be determined according to the size of the coding unit.

A second partition mode for representing the type of detailed partition may be determined according to the first partition mode.

The video encoding apparatus 100 may perform prediction encoding by using prediction units having a tree structure on the basis of hierarchical relationships between first partition modes and between partition levels, and compare results of the prediction encoding with one another, thereby determining a partition having highest encoding efficiency. The video encoding apparatus 100 may determine a partition of a first partition mode and a partition level that provide highest encoding efficiency, for each coding unit.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a transformation unit having a size smaller than or equal to the coding unit. For example, the transformation unit may include a transformation unit for an intra mode and a transformation unit for an inter mode.

Similarly to the coding unit based on the tree structure according to an exemplary embodiment, the transformation unit in the coding unit may be recursively split into smaller sized regions, and thus residual data in the coding unit may be divided according to the transformation having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when each of the height and width of the current coding unit is split into two equal parts, totally split into 4¹ transformation units, and the size of the transformation unit is thus N×N, and may be 2 when each of the height and width of the current coding unit is split into four equal parts, totally split into 4² transformation units and the size of the transformation unit is thus N/2×N/2. For example, the transformation unit may be set according to a hierarchical tree structure, in which a transformation unit of an upper transformation depth is split into four transformation units of a lower transformation depth according to the hierarchical characteristics of a transformation depth.

Similarly to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

Encoding information according to coding units corresponding to a coded depth uses not only information about the coded depth, but also information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail below with reference to FIGS. 11 and 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bitstream.

When the prediction unit is determined based on the first partition mode, the partition level, and the like described above with reference to FIGS. 1 through 7, the output unit 130 may encode and output partition information including the first partition mode and the partition level of a partition to serve as encoding information. The output unit 130 may also encode a motion vector and residual data in units of prediction units and output a result of the encoding.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

In addition, since the type of prediction units and partitions into which a coding unit is split may vary based on diverse sizes of coding units and also vary based on the first partition mode, the partition level, the second partition mode, and the like, prediction encoding based on the image characteristics included in the coding unit may be performed.

Figure 9:
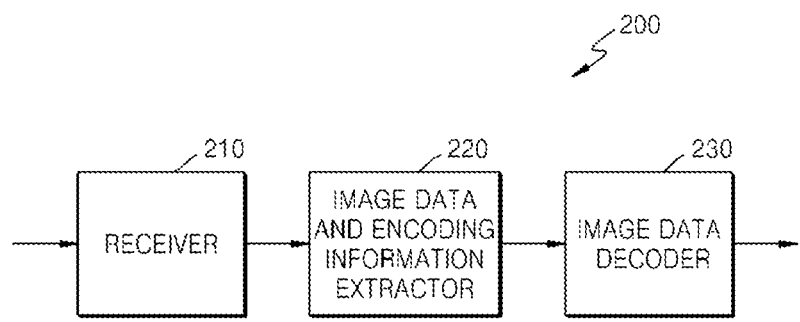
FIG. 9 is a block diagram of a video decoding apparatus that uses a variable partition for prediction encoding on the basis of coding units having a tree structure, according to an exemplary embodiment.

FIG. 9 is a block diagram of a video decoding apparatus that uses a variable partition for prediction encoding on the basis of coding units having a tree structure, according to an exemplary embodiment.

A video decoding apparatus 200 using a combination of data units on the basis of coding units having a tree structure, according to an exemplary embodiment, includes a receiver 210, an image data and encoding information extractor 220, and an image data decoder 230. For convenience of explanation, the video decoding apparatus 200 using the combination of data units on the basis of the coding units having a tree structure will hereinafter be shortened to a video decoding apparatus 200.

Definitions of various terms, such as a coding unit, a depth, a prediction unit, a transformation unit, and information about various encoding modes, for various operations of the video decoding apparatus 200 are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture or SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, encoding information about the coded depth and the encoding mode according to an exemplary embodiment may further include combination-related information about a current prediction unit or a current partition.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The information about the encoding mode according to an exemplary embodiment may include partition information that includes the first partition mode and the partition level.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

The image data decoder 230 may read the partition information from among the information about the encoding mode and determine a partition defined based on the first partition mode and the partition level from among the partition information. The image data decoder 230 may determine the shape and splitting directionality of a prediction unit on the basis of a first partition mode according to an exemplary embodiment, and determine a ratio of the size of the prediction unit to the size of a coding unit on the basis of the value of partition level. According to the first partition mode, the image data decoder 230 may determine a partition in consideration of the second partition mode for representing the type of detailed partitions.

The first partition mode, the partition level, and the second partition mode according to an embodiment may define a partition determined to have highest encoding efficiency by performing prediction encoding by using prediction units having a tree structure on the basis of hierarchical relationships between first partition modes and between partition levels and comparing results of the prediction encoding with one another during an encoding process. The image data decoder 230 may perform prediction decoding by using a partition of a first partition mode and a partition level that provide highest encoding efficiency, for each coding unit.

Also, the image data decoder 230 may read the information about a transformation unit based on a tree structure, including the information about the size of the transformation unit of the coding unit according to coded depths, and perform inverse transformation based on a transformation unit in units of a coding unit, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain encoding information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

The video decoding apparatus 200 extracts and reads partition information about a method of determining a partition through comparison between the results of prediction encoding with respect to the prediction units having a tree structure, and performs prediction decoding by using the partition information, thereby enabling accurate decoding.

A method of determining coding units having a tree structure, a prediction unit, and a transformation unit, according to an exemplary embodiment, will now be described with reference to FIGS. 10 through 20.

Figure 10:
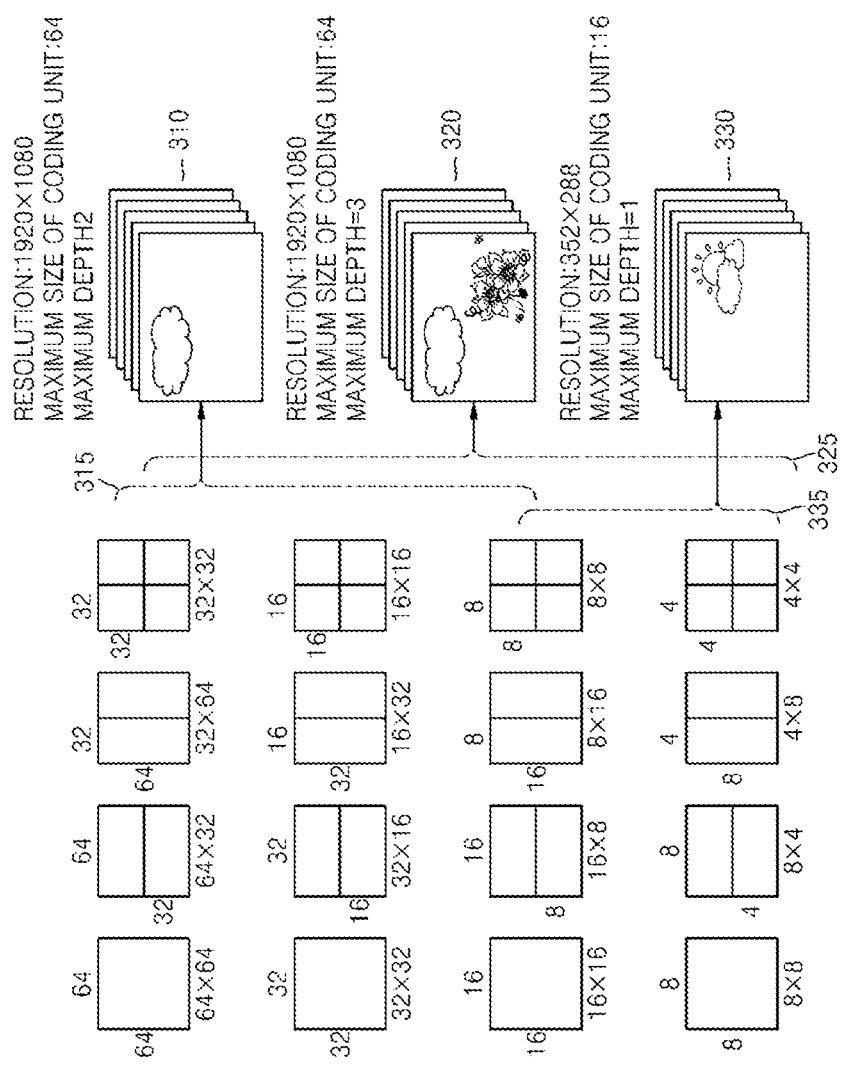
FIG. 10 is a diagram for describing a concept of coding units according to an exemplary embodiment.

FIG. 10 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 11:
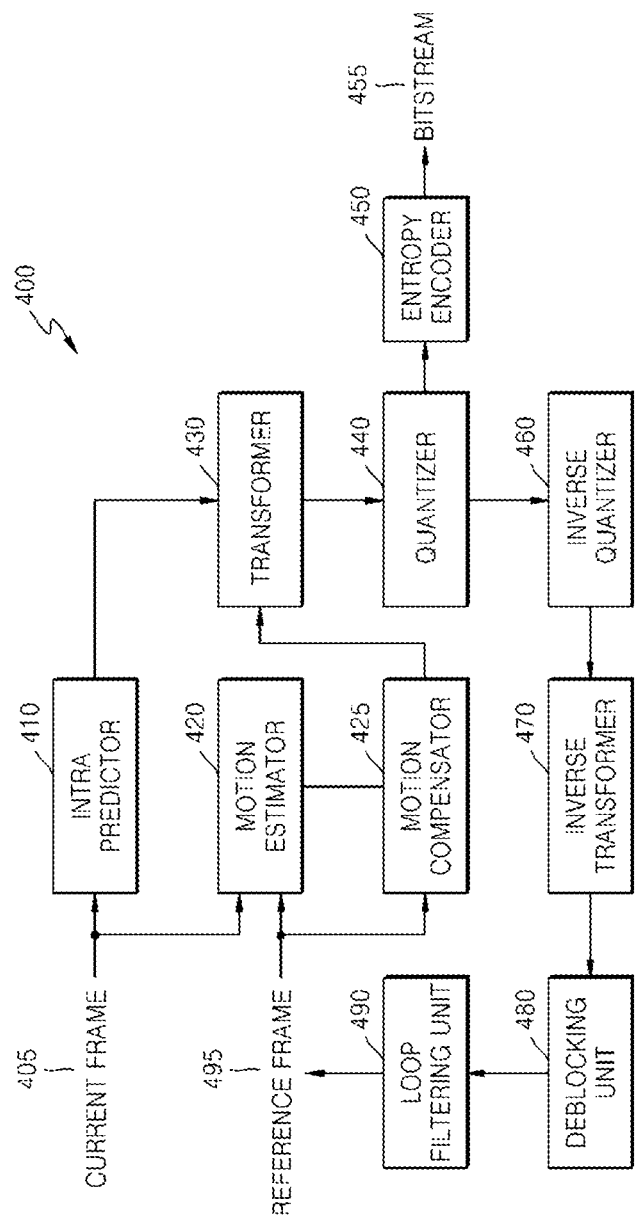
FIG. 11 is a block diagram of an image encoder based on coding units, according to an exemplary embodiment.

FIG. 11 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 perform inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490, perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 12:
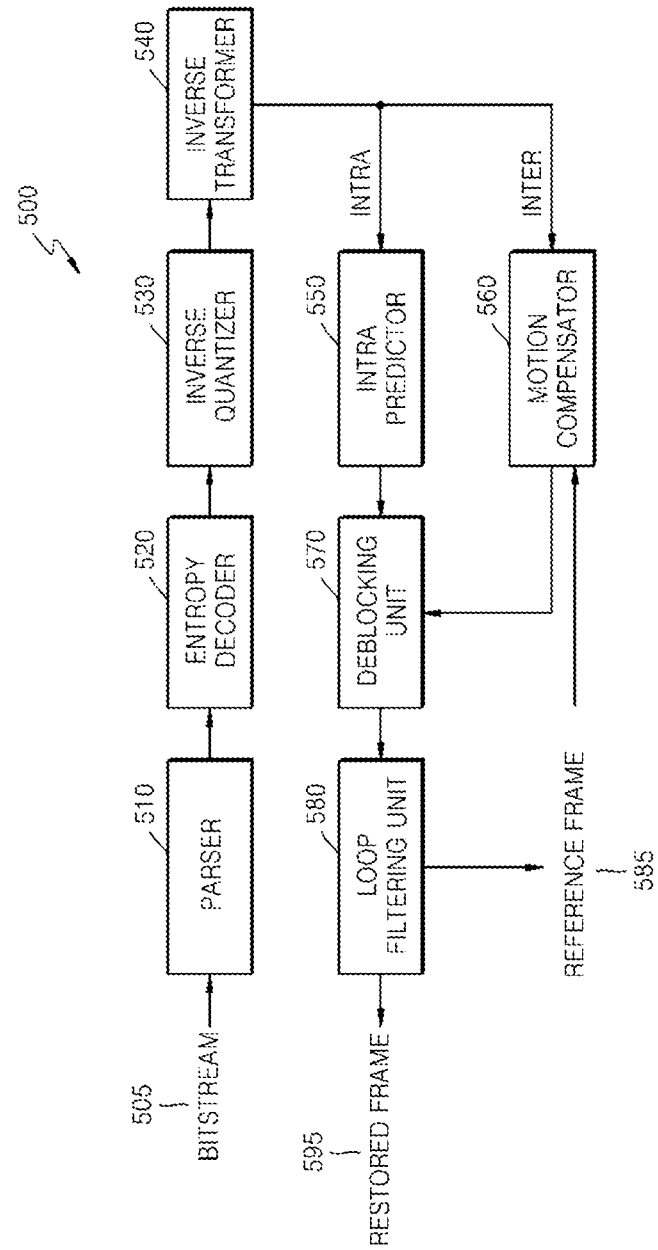
FIG. 12 is a block diagram of an image decoder based on coding units, according to an exemplary embodiment.

FIG. 12 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

Figure 13:
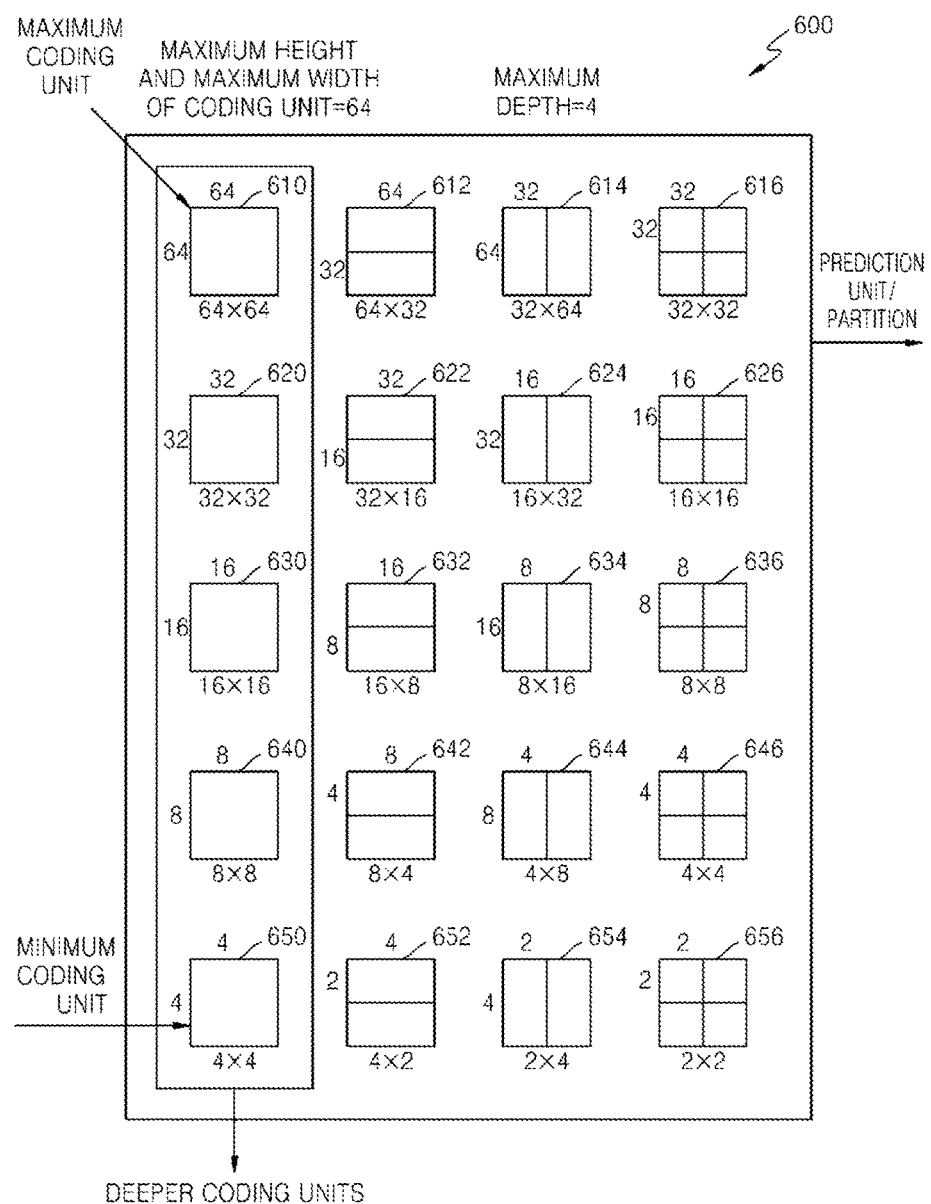
FIG. 13 is a diagram illustrating deeper coding units according to depths, and partitions, according to an exemplary embodiment.

FIG. 13 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. The maximum depth denotes a total number of splits from a maximum coding unit to a minimum decoding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4. Partitions 652 having a size of 4×2, partitions 654 having a size of 2×4, and partitions 656 having a size of 2×2 may also be used.

Since the partitions shown in FIG. 13 have shapes obtained by halving at least one of the height and width of the coding units corresponding to the partitions, the partitions of FIG. 13 may correspond to the partition sets 40, 41, 42, and 43 of the first partition modes 0, 1, 2, and 3 at the partition level of 0 described above with reference to FIGS. 1 through 7. For example, the partitions 610, 620, 630, 640, and 650 may correspond to the partition set 40 of the first partition mode 0 at the partition level of 0, and the partitions 612, 622, 632, 642, and 652 may correspond to the partition set 41 of the first partition mode 1 at the partition level of 0. The partitions 614, 624, 634, 644, and 654 may correspond to the partition set 42 of the first partition mode 2 at the partition level of 0, and the partitions 616, 626, 636, 646, and 656 may correspond to the partition set 43 of the first partition mode 3 at the partition level of 0.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 14:
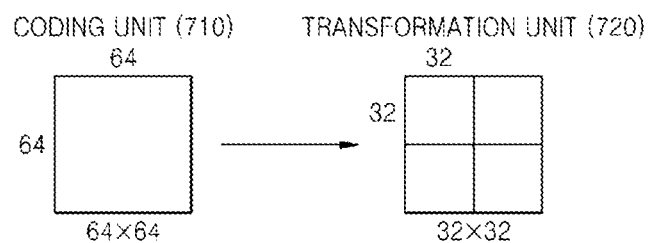
FIG. 14 is a diagram for describing a relationship between a coding unit and transformation units, according to an exemplary embodiment.

FIG. 14 is a diagram for describing a relationship between a coding unit 710 and transformation units 720, according to an exemplary embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 15:
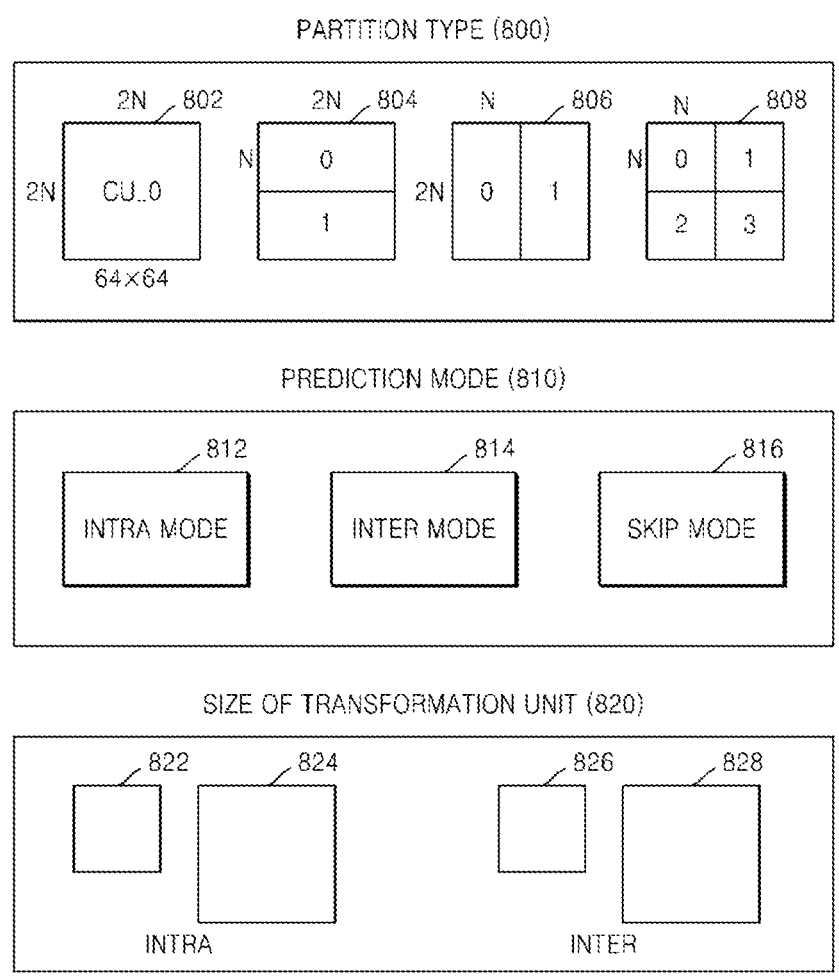
FIG. 15 is a diagram for describing encoding information of coding units corresponding to a coded depth, according to an exemplary embodiment.

FIG. 15 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the information 800, 810, and 820 for decoding, according to each deeper coding unit.

The information 800 may include partition information as the information about the encoding mode according to an exemplary embodiment. For example, the information 800 may include a partition type determined based on first partition mode information, a partition level, and a second partition mode information.

Figure 16:
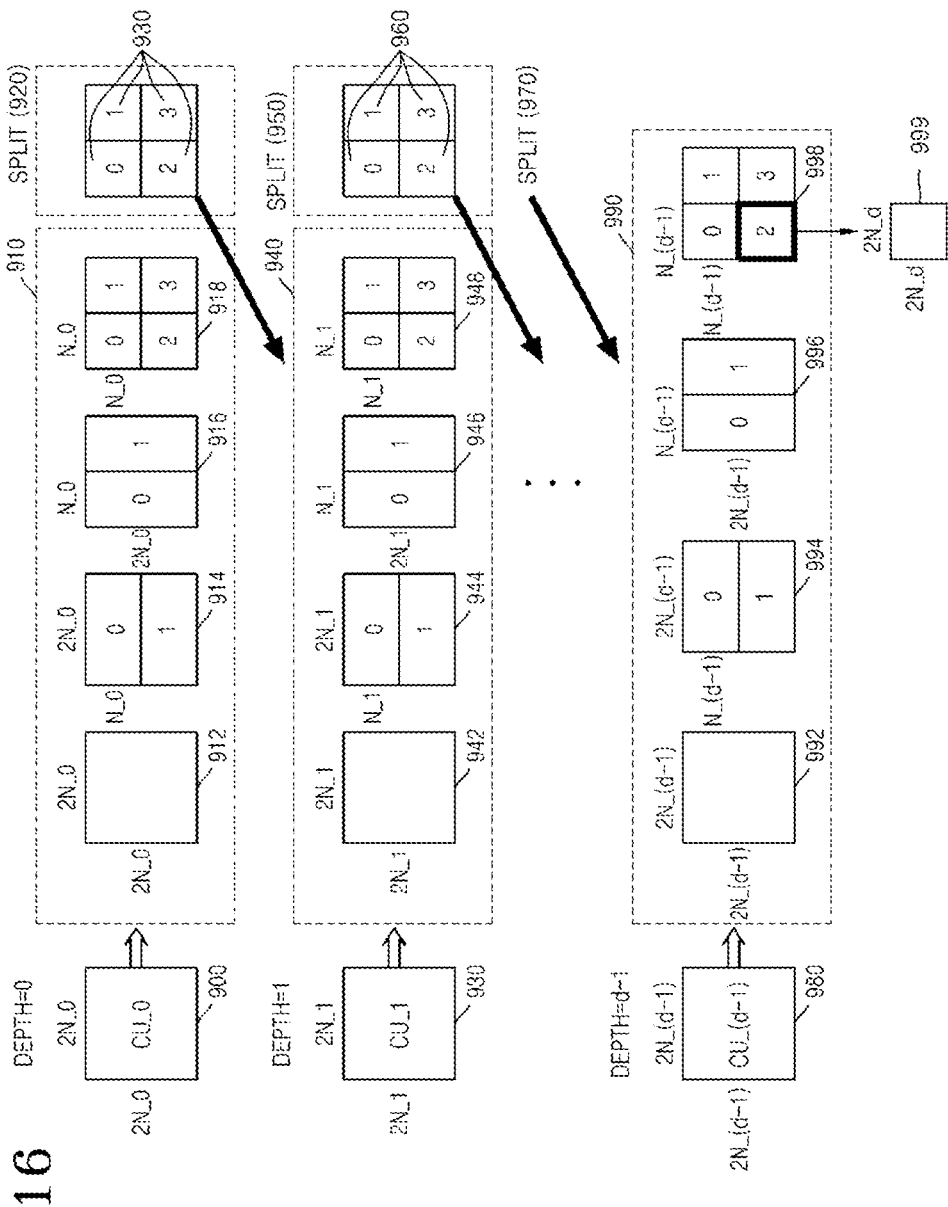
FIG. 16 is a diagram of deeper coding units according to depths, according to an exemplary embodiment.

FIG. 16 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 16 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 17:
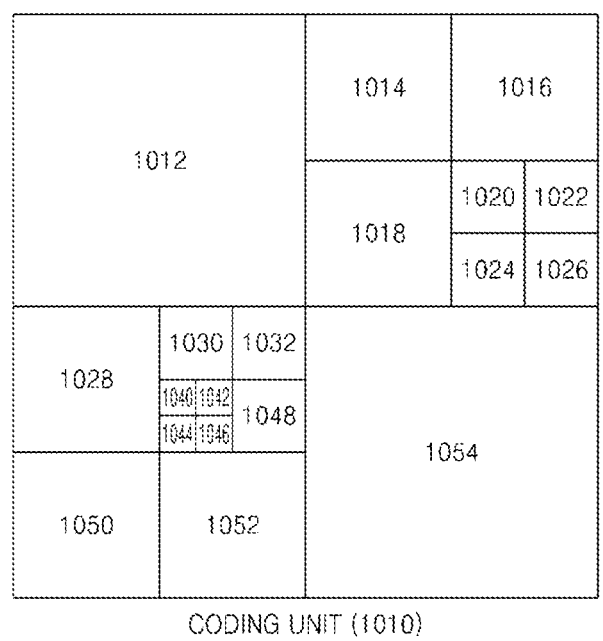
FIGS. 17, 18, and 19 are diagrams for describing a relationship between coding units, prediction units, and transformation units, according to an exemplary embodiment.
Figure 18:
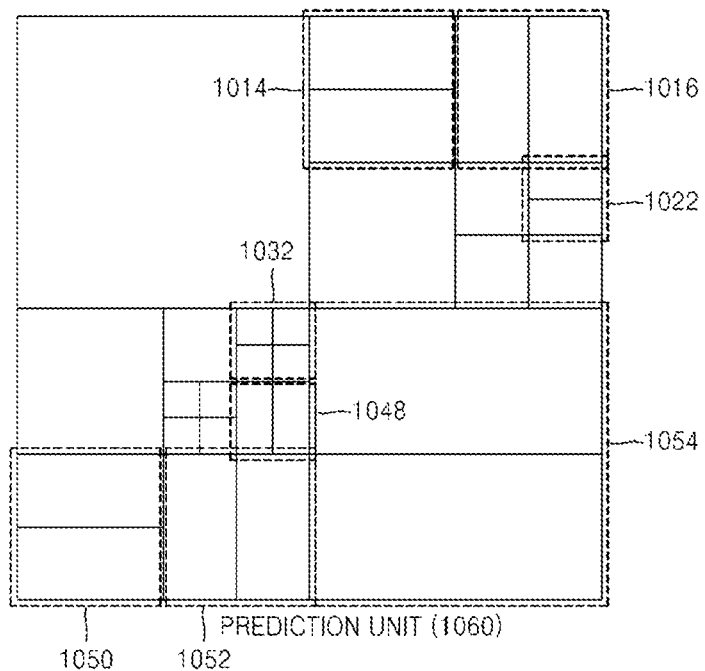
Figure 19:
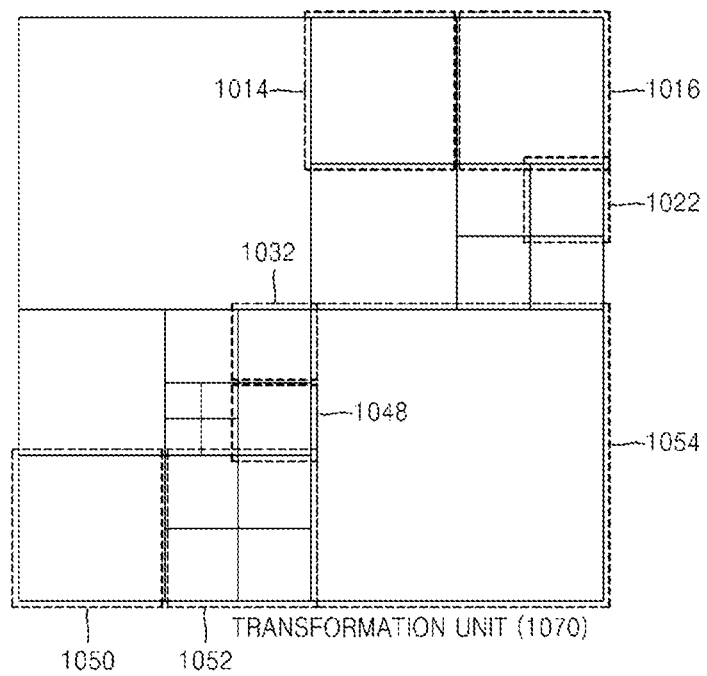

FIGS. 17 through 19 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 2 shows the encoding information that may be set by the video encoding and decoding apparatuses 100 and 200.

TABLE 2

| | Split Information 0 (Encoding on Coding Unit having Size of 2N × 2N and Current Depth of d) | | | | Split Information 1 |
|---|---|---|---|---|---|
| Prediction Mode | Partition Type | | Size of Transformation Unit | | Repeatedly Encode |
| Intra Inter Skip (Only 2N × 2N) | Symmetrical Partition Type | Asymmetrical Partition Type | Split Information 0 of Transformation Unit | Split Information 1 of Transformation Unit | Coding Units having Lower Depth of d + 1 |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

Referring to the partitions having a tree structure of FIG. 4, the asymmetrical partition types having sizes of 2N×nU and 2N×nD may correspond to the partition sets 51*a* and 51*b* of the first partition mode 1 at the partition level of 1, and the asymmetrical partition types having sizes of nL×2N and nR×2N may correspond to the partition sets 52*a* and 52*b* of the first partition mode 2 at the partition level of 1. The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 20:
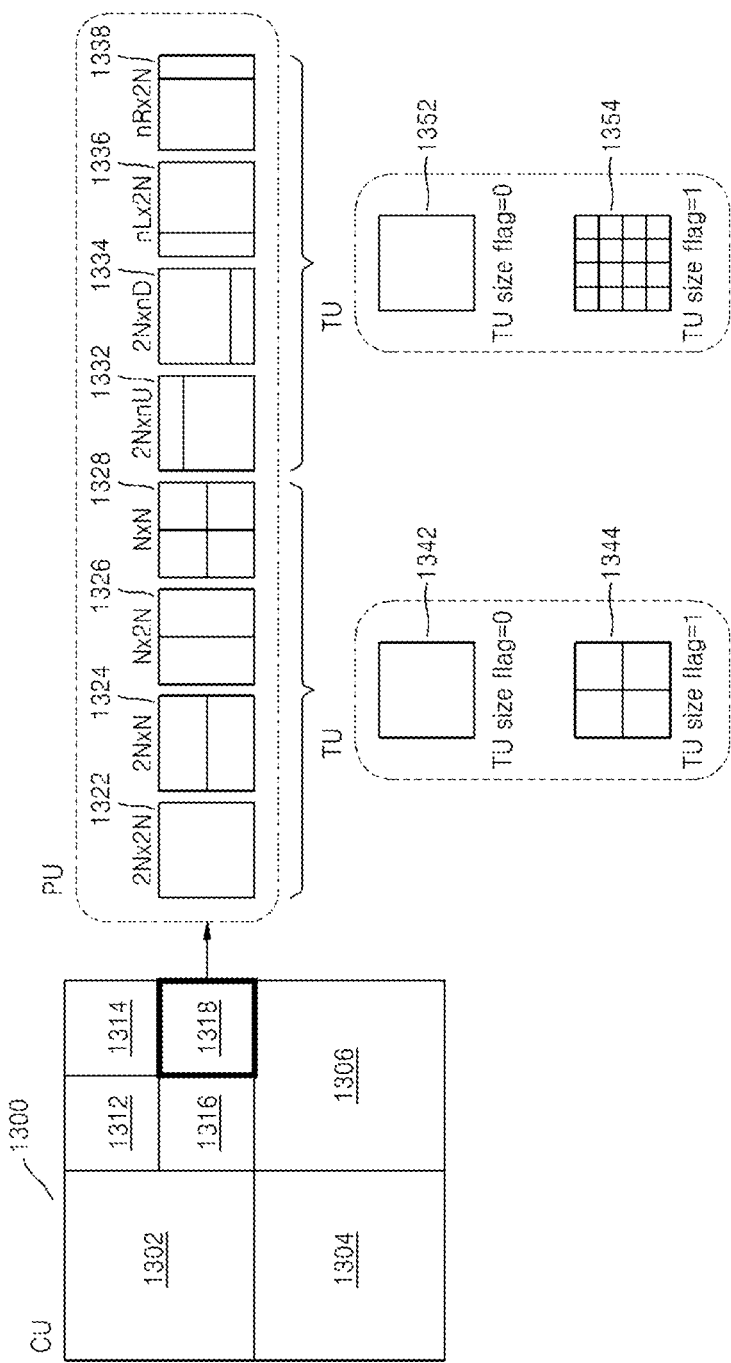
FIG. 20 is a diagram for describing a relationship between a coding unit, a prediction unit or a partition, and a transformation unit, according to encoding mode information of Table 1.

FIG. 20 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Such a partition type may correspond to some of the partitions shown in FIG. 4. For example, the partition type 1322 having a size of 2N×2N may correspond to the partition set 40 (the first partition mode 0 at the partition level of 0). The partition type 1324 having a size of 2N×N and the partition type 1326 having a size of N×2N may respectively correspond to the partition sets 41 and 42 (the first partition modes 1 and 2 at the partition level of 0, respectively). The partition type 1328 having a size of N×N may correspond to the partition set 43 (the first partition mode 3 at the partition level of 0). The partition type 1332 having a size of 2N×nU and the partition type 1334 having a size of 2N×nD may respectively correspond to the partition sets 51*a* and 51*b* (both the first partition mode 1 at the partition level of 1). The partition type 1336 having a size of nL×2N and the partition type 1338 having a size of nR×2N may respectively correspond to the partition sets 52*a* and 52*b* (both the first partition mode 2 at the partition level of 1). Split information (TU size flag) of a transformation unit is a sort of a transformation index, and the size of a transformation unit corresponding to the transformation index may vary according to the prediction unit type or partition type of the coding unit.

For example, when the partition type is set to be symmetrical, i.e. the partition type 1322, 1324, 1326, or 1328, a transformation unit 1342 having a size of 2N×2N is set if the TU size flag of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

The TU size flag described above with reference to FIG. 18 is a flag having a value or 0 or 1, but the TU size flag is not limited to 1 bit, and a transformation unit may be hierarchically split having a tree structure while the TU size flag increases from 0. The TU size flag of a transformation unit may be used as an exemplary embodiment of the transformation index.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, if the size of a current coding unit is 64×64 and a maximum transformation unit size is 32×32, then the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, then the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\wedge}\text{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize' when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and another exemplary embodiment is not limited thereto.

The prediction unit or partitions described above with reference to FIGS. 10 through 20 are used as only partitions of the partition modes 0, 1, 2, and 3 at the partition level of 0 and the first partition modes 1 and 2 at the partition level of 1 in the tree structure 50 of partitions of FIG. 4. According to a system circumference and setting, the upper limits of the partition level and the first partition mode may be selectively limited. The partition levels and the first partition modes shown in FIGS. 10 through 20 are only an embodiment, so the idea of the present invention is not limited thereto.

Figure 21:
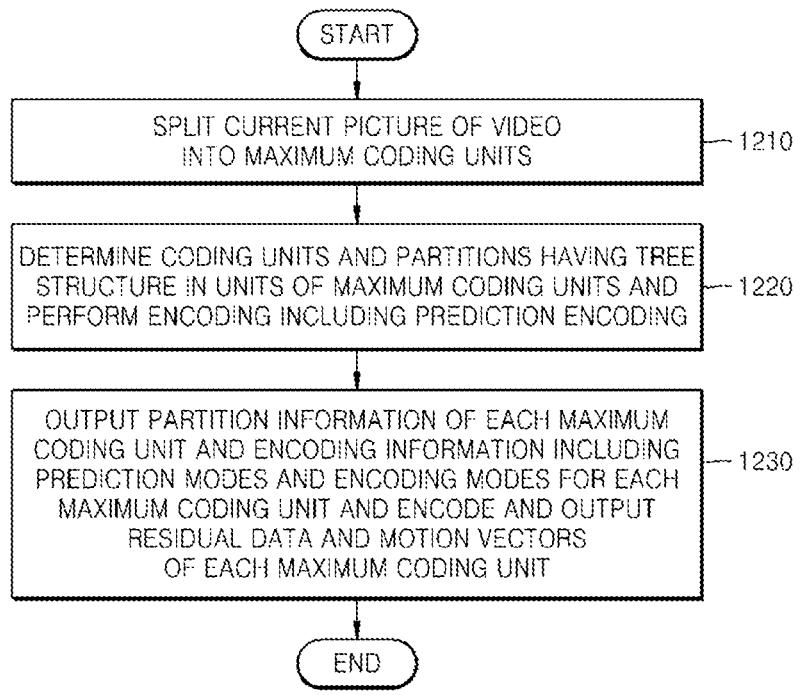
FIG. 21 is a flowchart of a video encoding method using a variable partition based on coding units having a tree structure, according to an exemplary embodiment.

FIG. 21 is a flowchart of a video encoding method using a variable partition for prediction encoding on the basis of coding units having a tree structure, according to an exemplary embodiment.

In operation 1210, a current picture of a video may be split into maximum coding units. In operation 1220, image data of each maximum coding unit of the current picture is encoded in units of deeper coding units. Prediction encoding using partitions having a tree structure, which are based on first partition modes and partition levels, may be performed in units of a coding unit, and thus a partition or prediction unit having highest prediction encoding efficiency may be determined. A depth having highest encoding efficiency while including prediction error may be selected as an coding depth, and coding units having the depth determined as the encoding depth and having a tree structure may be determined.

In operation 1230, residual data and a motion vector of each maximum coding unit may be encoded based on the coding units having the tree structure, prediction units, or partitions. Partition information including first partition modes, partition levels, and the like for determining a prediction unit may be encoded together with information about a coding depth, a prediction mode, and an encoding mode, and may be output as encoding information.

Figure 22:
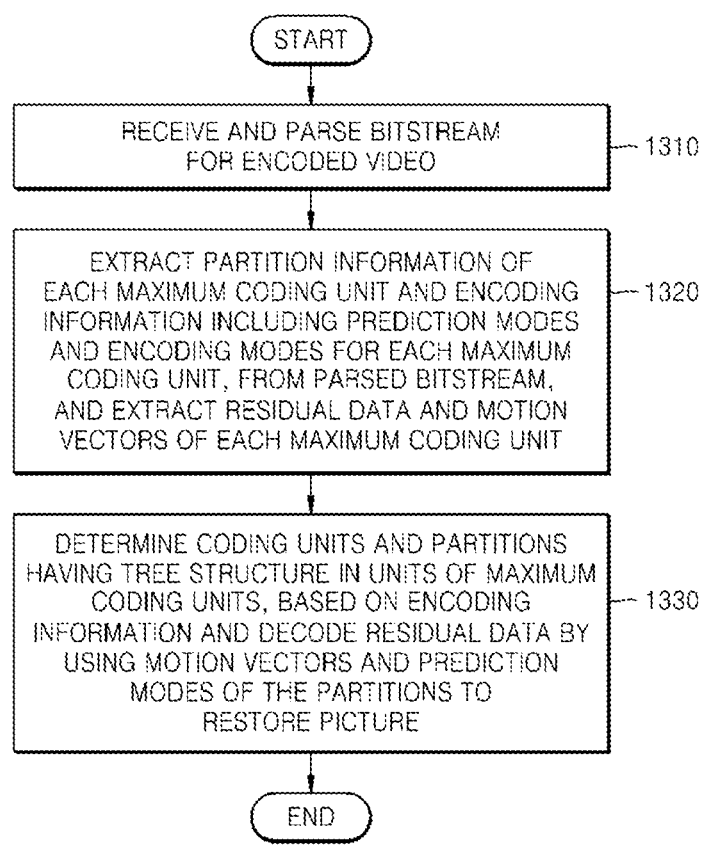
FIG. 22 is a flowchart of a video decoding method using a variable partition based on coding units having a tree structure, according to an exemplary embodiment.

FIG. 22 is a flowchart of a video decoding method using a variable partition for prediction encoding on the basis of coding units having a tree structure, according to an exemplary embodiment.

In operation 1310, a bitstream for an encoded video is received and parsed. In operation 1320, information about a coding depth and an encoding mode of each maximum coding unit is extracted from the parsed bitstream according to coding units having a tree structure. Partition information according to an exemplary embodiment from among the information about a coding depth and an encoding mode may be extracted. The partition information may include first partition modes and partition levels and may further include second partition modes according to the first partition modes. Encoded residual data and motion vector may be extracted in units of prediction units.

In operation 1330, coding units having a tree structure may be determined in units of maximum coding units, based on the information about a coding depth and an encoding mode, prediction units and partitions may be determined based on the partition information, and prediction decoding may be performed on the prediction units and the partitions. The shapes, splitting directionalities, and sizes of prediction units and partitions into which a coding unit is split may be determined based on the first partition information and the partition levels included in the partition information. A picture may be restore by decoding residual data of each prediction unit and each partition by using prediction mode information and motion vectors.

The video encoding apparatus 100 may perform prediction encoding on prediction units (partitions) of various sizes, various shapes, and various prediction modes having a tree structure on the basis of the variable sizes of coding units having a tree structure and compare results of the prediction encoding with one another, thereby determining a prediction unit (partition) having highest encoding efficiency. Therefore, prediction encoding considering the characteristics of an image within a coding unit that is variable according to the size of the coding unit may be possible.

Moreover, since information about factors that determine prediction units used for prediction encoding is encoded and transmitted, the video decoding apparatus 200 may guarantee accurate restoration.

Exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

While exemplary embodiments have been particularly shown and described above, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the invention is defined not by the detailed description of exemplary embodiments, but by the appended claims, and all differences within the scope will be construed as being included in the present invention.

What is claimed is:

1. A method of decoding video, the method comprising:
receiving a bitstream including data of a picture, information about a size of a maximum coding unit, and split information;
splitting the picture into a plurality of maximum coding units, including the maximum coding unit, using the information about the size of the maximum coding unit;
hierarchically splitting a maximum coding unit among the plurality of maximum coding units into a plurality of coding units based on the split information, wherein the split information indicates whether a coding unit of depth k, where k is integer, is split into coding units of depth k+1;
determining one or more prediction units in a coding unit among the plurality coding units using partition type information, performing prediction on a prediction unit among the one or more prediction units in the coding unit; and
generating a reconstructed coding unit based on the prediction,
wherein the partition type information indicates one of a symmetric type and an asymmetric type when a size of the coding unit is larger than a predetermined size.

2. A method of encoding video, the method comprising:
splitting a picture into a plurality of maximum coding units including a maximum coding unit;
splitting a maximum coding unit among the plurality of maximum coding units into a plurality of coding units;
determining one or more prediction units in a coding unit among the one more coding units;
performing prediction on a prediction unit among the plurality of prediction units in the coding; and
generating a bitstream including data of the picture, information about a size of the maximum coding unit, partition type information of the coding unit, and split information of the coding unit,
wherein the partition type information indicates one of a symmetric type and an asymmetric type when a size of the coding unit is larger than a predetermined size.

3. A non-transitory computer-readable medium for storing data associated with a video, comprising a bitstream stored in the non-transitory computer readable medium, the bitstream including:
split information of a coding unit for hierarchically splitting a maximum coding unit among a plurality of maximum coding units into one or more coding units,
information about a size of a maximum coding unit for splitting a picture into the plurality of maximum coding units including the maximum coding unit,
partition type information of the coding unit, wherein the partition type information indicates one of a symmetric type and an asymmetric type when a size of the coding unit is larger than a predetermined size.

\* \* \* \* \*